United States Patent [19]

Stehning et al.

[11] Patent Number: 4,539,024
[45] Date of Patent: Sep. 3, 1985

[54] SCRUBBER FOR THE DESULFURIZATION OF FLUE GASES

[75] Inventors: Werner Stehning, Dorsten; Horst D. Nüsser, Castrop-Rauxel, both of Fed. Rep. of Germany

[73] Assignee: Gottfried Bischoff Bau kompl. Gasreinigungs -und Wasserruckkuhlanlagen GmbH & Co. Kommanditgesellschaft, Essen, Fed. Rep. of Germany

[21] Appl. No.: 570,038

[22] Filed: Jan. 11, 1984

[30] Foreign Application Priority Data

Jan. 20, 1983 [DE] Fed. Rep. of Germany ....... 3301688

[51] Int. Cl.³ ................... B01D 45/08; B01D 47/06
[52] U.S. Cl. ....................................... 55/223; 55/242; 55/257 PV; 55/443
[58] Field of Search .................. 55/185–187, 55/223, 242, 257 PV, 442–446; 422/178, 191, 210, 306; 423/242 R

[56] References Cited

U.S. PATENT DOCUMENTS

| Re. 29,813 | 10/1978 | Yamamichi et al. | 423/242 R |
|---|---|---|---|
| 1,754,477 | 4/1930 | Menzin | 55/444 X |
| 1,890,294 | 12/1932 | Hughes | 55/444 X |
| 1,897,727 | 2/1933 | Hughes et al. | 55/442 X |
| 1,916,528 | 7/1933 | Raymond | 55/442 X |
| 2,213,881 | 9/1940 | Lauer | 55/223 |
| 2,234,735 | 3/1941 | Lambert et al. | 55/242 X |
| 2,440,860 | 5/1948 | Kalmeyer | 55/446 X |
| 2,575,359 | 11/1951 | Ortgies | 55/223 |
| 2,587,417 | 2/1952 | Vedder | 55/442 |
| 2,601,519 | 6/1952 | Hardy et al. | 55/223 X |
| 2,736,390 | 2/1956 | Wickland | 55/223 |
| 2,976,954 | 3/1961 | Irwin | 55/442 X |
| 3,225,522 | 12/1965 | Black | 55/223 |
| 3,593,497 | 7/1971 | Grimm | 423/242 R X |
| 3,687,630 | 8/1972 | Tailor | 423/242 R |
| 3,727,381 | 4/1973 | Kreimann | 55/242 X |
| 3,907,526 | 9/1975 | Saleem et al. | 55/223 |
| 3,912,471 | 10/1975 | Cotton, Jr. | 55/443 X |
| 4,157,250 | 6/1979 | Regehr et al. | 55/443 X |
| 4,164,399 | 8/1979 | Kannapell | 55/223 |
| 4,175,938 | 11/1979 | Regehr et al. | 55/442 X |
| 4,198,215 | 4/1980 | Regehr | 55/185 |
| 4,251,242 | 2/1981 | Ito | 55/242 |
| 4,312,646 | 1/1982 | Fattinger et al. | 55/227 X |
| 4,383,500 | 5/1983 | Lavalerie et al. | 55/444 X |
| 4,409,064 | 10/1983 | Vora et al. | 55/185 X |

*Primary Examiner*—Robert Spitzer
*Attorney, Agent, or Firm*—Karl F. Ross; Herbert Dubno

[57] ABSTRACT

A scrubbing column for flue gases and especially power plant flue gases removes sulfur oxides by absorption in a calcium containing scrubbing liquid and is surmounted by a water separator which is subdivided into sectors readily traversed by the flue gas at the head of the column and around a central plenum. The passage around these sectors, which is connected with a radially offset flue gas outlet, has a cross section progressively increasing toward this outlet.

5 Claims, 4 Drawing Figures

SCRUBBER FOR THE DESULFURIZATION OF FLUE GASES

CROSS REFERENCE TO RELATED APPLICATIONS

This application is related to the commonly assigned copending application Ser. No. 559,916 filed Dec. 9, 1983 by Karl-Rudolf HEGEMANN, Helmut WEISSERT and Jürgen LEIMKÜHLER, based upon German application P 3245 754.5 filed Dec. 10, 1982 and is also related to the commonly assigned copending application Ser. No. 546,486 filed Oct. 28, 1983 by Helmut WEISSERT and Karl-Rudolf HEGEMANN, two of the present joint inventors, and disclosing and claiming subject matter which is also to be found in the corresponding German application P 32 40 317.8 filed Oct. 30, 1982.

That application, in turn, refers to still earlier applications including the following:

Ser. No. 402,570 filed July 28, 1982 (now abandoned),
Ser. No. 515,919 filed July 20, 1983, and
Ser. No. 493,984 filed May 12, 1983.

Reference may be had to the following additional applications in whole or in part, commonly owned with the present case:

Ser. No. 405,603 filed Aug. 5, 1982 (now abandoned),
Ser. No. 321,071 filed Nov. 13, 1981, now U.S. Pat. No. 4,427,183, and
Ser. No. 327,500 filed Dec. 4, 1981, now U.S. Pat. No. 4,415,142.

Reference may be had as well to the below-listed United States patents, their German counterparts and the patents cited in these documents or listed in the files thereof:

U.S. Pat. No. 4,375,439,
U.S. Pat. No. 4,316,727,
U.S. Pat. No. 4,218,241,
U.S. Pat. No. 4,145,193,
U.S. Pat. No. 4,052,042, and
U.S. Pat. No. 4,007,025.

FIELD OF THE INVENTION

Our present invention relates to a scrubber for flue gases and especially the flue gases of fossil-fuel boilers, e.g. power plant boilers, which are utilized at least in part in the scrubbing of the flue gas with a scrubbing liquid containing a calcium compound so that calcium sulfite and/or calcium sulfate are produced in the sump product of this scrubber. More specifically, the invention relates to a scrubber for this purpose which has a substantially cylindrical shell or tower in which the scrubbing action takes place above the shell and which is provided with a droplet or water separator above the tower for removal of liquid from the scrubbed flue gases as they leave the tower.

BACKGROUND OF THE INVENTION

From the aforementioned copending applications and other literature, it will be apparent that considerable attention has been directed in recent years, because of the need to reduce environmental pollution, to the more effective cleaning of flue gases before they are discharged into the atmosphere.

The flue gases with which the invention is concerned are primarily the sulfur-containing flue gases resulting from the combustion of fossil-fuels, e.g. coal, in boilers and especially power plant boilers.

Generally speaking, the sulfur content of such flue gases is in the form of sulfur dioxide and sulfur trioxide, so that the scrubbing of the flue gases can be effected with a scrubbing solution in an upright scrubbing column, the scrubbing liquid containing a calcium compound which reacts to form compounds with the sulfur oxides, namely calcium sulfate and calcium sulfite.

Since calcium sulfate recovered as described in the copending applications may be a valuable by-product of the gas-cleaning process because of its utility as gypsum in the construction trades, provision may be made for oxidizing calcium sulfite to the calcium sulfate.

The calcium compound which is used may be any compound which is soluble in the scrubbing liquid or which forms a suspension thereof and which is capable of enabling the calcium to react with the sulfur dioxide and sulfur trioxide or the acids formed thereby during the scrubbing action. The most common calcium compounds for this purpose are the calcium carbonate which can be suspended in the scrubbing liquid, calcium oxide which can be added thereto or calcium hydroxide which can be utilized, for example as milk of lime, as an additive to the scrubbing liquid. For convenience of description, all of these additives, because they act similarly, may be referred to as lime hereinafter.

More specifically, it is known to provide a scrubber for the desulfurization of a fossil-fuel boiler flue gas, especially an electricity-generating power plant boiler flue gas, which has the configuration of a tower, i.e. is generally cylindrical and upright and is provided with a flue gas inlet at the bottom of this tower but above the sump of the column, a flue gas outlet in the region of the top or head of the tower, a device for feeding the scrubbing liquid, and the aforementioned sump in which the scrubbing liquid collects.

From this sump, a suspension of the scrubbing liquid, the calcium compounds (lime) and previously precipitated calcium sulfite and/or calcium sulfate can be recirculated to the tower thereabove to scrub the rising flue gas in the counterflow scrubbing action.

From the sump, moreover, the suspension can be withdrawn as desired for recovery of calcium sulfate. At the head of the tower, a liquid separator (water separator) can be provided to strip entraining scrubbing liquid from the departing gas and to return the recovered scrubbing liquid to the tower and the sump.

From this liquid separator, the scrubbed gas may be discharged through a flue gas outlet which can communicate radially with the shell of the separator.

The separators provided for such scrubbers heretofore were generally of the cyclonic or vortex type. With high velocities of the flue gas in the head of the tower, this has created problems because water recovered by the separator tended to be reentrained by the gas. Furthermore, there was a tendency for deposits of calcium sulfite and/or calcium sulfate to build up upon the surfaces of the separator.

OBJECTS OF THE INVENTION

It is the principal object of the present invention to provide an improved scrubbing column for the purposes and of the type described whereby the problems described above are eliminated, other drawbacks with prior art liquid separators are obviated and, in general, the liquid separator is capable of operating more efficiently and effectively for the separation of scrubbing liquid from the discharged flue gas.

Another object of the invention is to provide a scrubbing column for the purposes described in which the liquid separator is operable even at high gas velocities without reentrainment of separated liquid and, moreover, wherein deposition of solids such as calcium sulfate and calcium sulfite on the separator surfaces is precluded.

SUMMARY OF THE INVENTION

According to the present invention, these objects are attained in a scrubber for the flue gases of fossil-fuel boilers and especially power plant boilers, wherein the scrubbing column has a cylindrical tower provided at its upper end with a head having a liquid separator and a sump below this tower, the tower being provided with a gas inlet above the sump, with means for scrubbing flue gas rising in the tower with a scrubbing liquid containing lime so that a suspension of calcium sulfite and/or calcium sulfate is formed in the sump, and with an outlet at the head of the tower for flue gas.

According to the present invention, this liquid separator comprises a crown of liquid-separating registers, each of which comprises a plurality of spaced-apart impingement-baffle separators, this crown being disposed around a free plenum or flue gas inlet chamber surrounded by the sectors containing the respective impingement-baffle separators which are traversed in a radial direction by the flue gas.

These registers are connected to an annular discharge passage for the flue gas whose flow cross section generally increases in the direction of the outlet.

The invention is based upon our discovery that the use of a crown of separating registers, which are traversed in the radial direction by the flue gas, permits the flow cross section to increase as the flue gas traverses each sector and after the flue gas leaves each sector as it is conducted along the annular discharge passages, so that the velocity of a gas tends to drop over the full liquid separation path and reentrainment of droplets is precluded.

Since a plurality of impingement-baffle separators, each with a stack of vertically oriented plates, is provided in each sector and these separators are traversed in turn by the gas, an especially high degree of separation can be obtained.

Furthermore, by separating the sectors from one another, e.g. with partitions or guide bodies which guide the segmented gas flow, undesired transverse movements of the gas can be eliminated. This completely eliminates any tendency for vortex formation so that reentrainment of water does not occur and, consequently, a tendency for calcium sulfate and calcium sulfite to deposit on the baffle surface is eliminated.

It has been found to be especially advantageous when, between the impingement baffle separators of each sector, baffle-free spaces are provided which are traversed by the gas.

Best results are obtained when the impingement baffle separators are of the direction change type having a zigzag configuration with the plates lying in vertical planes. The baffles can be provided with liquid-catching channels which are open downwardly so that the liquid flows freely downwardly.

While the number of sectors can be selected at will, it has been found to be advantageous to provide ten such sectors in a crown so that ten water-separating registers are provided and are defined in turn between generally radial partition or guiding bodies lying in vertical planes. These sector partitions can also be constituted as flue gas-directing installations which function for guide and baffling purposes in addition to constituting structural supports for the respective registers and as dividers for the sectors. The installations ensure that the pressure drops across the registers are the same.

In the usual operation of a scrubbing column, the liquid separator is intended to remove practically all of the entrained liquid from the scrubbed flue gas under conditions so that a minimum of calcium sulfite and calcium sulfate will deposit upon surfaces. With the present invention, however, it has been found to be possible to provide fore and/or aft of the impingement-baffle separators spray nozzles for directing sprays of the scrubbing liquid on the baffle surfaces.

This has been found to be highly advantageous because not only does it provide further assurance against the build-up of deposits by flushing the surfaces but it induces a condensation effect which further decreases the moisture content of the discharged flue gas.

Alternatively, the flushing can be carried out sector by sector with selective closing off of the sectors to be flushed by appropriate flaps during the flushing operation. Consequently, in this mode of operation sectors are shut off from the flue gas flow for brief periods in a cyclical manner while the baffling surfaces are flushed with the scrubbing liquid or with water. The flue gas outlet is preferably connected to the shell or casing of the water separator with a radial outflow pipe.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
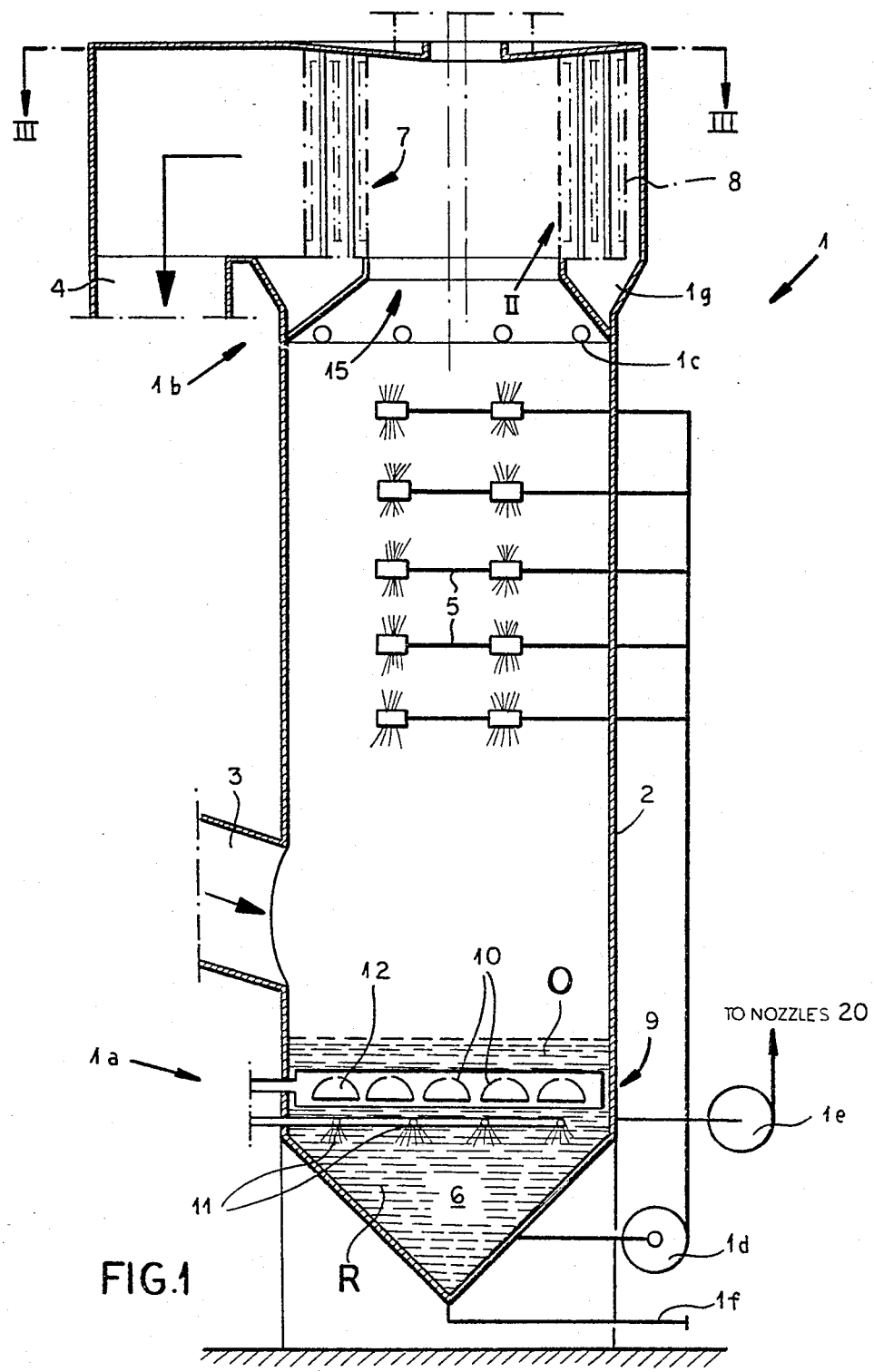
FIG. 1 is an axial section through a scrubbing column according to the invention, diagrammatically illustrating the essential portion thereof.

The scrubbing column 1 shown in the drawing comprises a cylindrical tower 2 of which only the cylindrical casing has been shown in FIG. 1 and which is upright, and is provided with spray heads constituting a scrubbing device for treating flue gas and with an inlet 3 at the lower end of the tower but above the sump for connecting the scrubbing column to a fossil-fuel boiler combustion chamber, especially a power plant boiler combustion chamber for the desulfurization of the flue gases of the boiler.

In the region of the bottom 1a of the column, a sump 6 is provided for collecting the scrubbing liquid, an aqueous solution as will be described, which rains down to the sump through the rising flue gas. At the head 1b of the column, a water separator 7 is provided for stopping entrained liquid from the flue gas, the entrained liquid being returned through an opening 1c to the sump. The filling gas is discharged from the head of the column via an outlet 4.

From the scrubbing liquid sump 6, a suspension of calcium sulfite and/or calcium sulfate and other calcium compounds as described, in water, is withdrawn by a pump 1d and recirculated to the spray heads 5. In addition, a portion of the scrubbing liquid may be circulated by a further pump 1e from the sump to scrubbing nozzles 20 which will be described in greater detail with reference to FIG. 2.

The suspension can also be withdrawn at 1f for processing to recover calcium sulfate therefrom for use in construction.

The liquid separator 7 is formed with a periphery 8 which communicates with the outlet 4 radially, i.e. the outlet 4 is radially offset from the liquid separator 7.

From FIG. 1 it will also be apparent, as described in the latest of the above mentioned copending applications, that means 11 can be provided to supply make-up water and the calcium compound, e.g. as milk of lime, to the sump below a unit 10,12 for introducing oxygen, thereby enabling oxidation of sulfite to sulfate in the sump.

The column above the sump operates as an absorption region in which the sulfur dioxide and sulfur trioxide are taken up by the scrubbing liquid in an absorption reaction so that calcium sulfate and calcium sulfite are found on the sump product.

The sump 6 is provided with a horizontal grate 9 of oxygen inlet pipes 10 so that as the oxygen rises after being emitted from these pipes, an oxygen zone 0 is formed in the sump above the grate while a reaction zone R is formed below the grate. The inlets 11 for the feeding of additives to the sump are also located below the grate 9.

The oxygen supply pipes of the grate can comprise a plurality of parallel, downwardly open hoods 10 which have upwardly turned oxygen outlet bores from which technical grade oxygen, oxygen-enriched air or atmospheric oxygen is discharged. The spacing between the hoods 10 is so selected with respect to the flow velocity that a backflow from the reaction zone R to the oxidation zone 0 cannot occur. The channels formed by the downwardly open hoods 10 maintain air cushions therein so that the scrubbing liquid in the oxidation zone cannot "rain" into the reaction zone through the hoods.

In the scrubbing zone of the column, the absorption action results in an uptake of the sulfur dioxide and sulfur trioxide from the flue gas and by appropriate selection of pH value and oxygen level of the flue gas, primary sulfite is formed, this sulfite being transformed in the oxidation zone into sulfate. In practice, an addition of sulfuric acid to the oxidation zone is not necessary since the pH which is controlled by the addition of milk of lime can be maintained below 7 in the oxidation zone for the oxidation of the sulfite to sulfate and in the preferred range of 4 to 6.5.

In the reaction zone R the pH increases by the addition of the milk of lime and gypsum can precipitate from solution so that the sump product tapped from the bottom of the sump at 1f can be sludge or slurry with a high calcium sulfate content which can be utilized as a gypsum source directly or can be processed further as described in the aforementioned applications to enable the recovery of construction grade gypsum therefrom.

Figure 2:
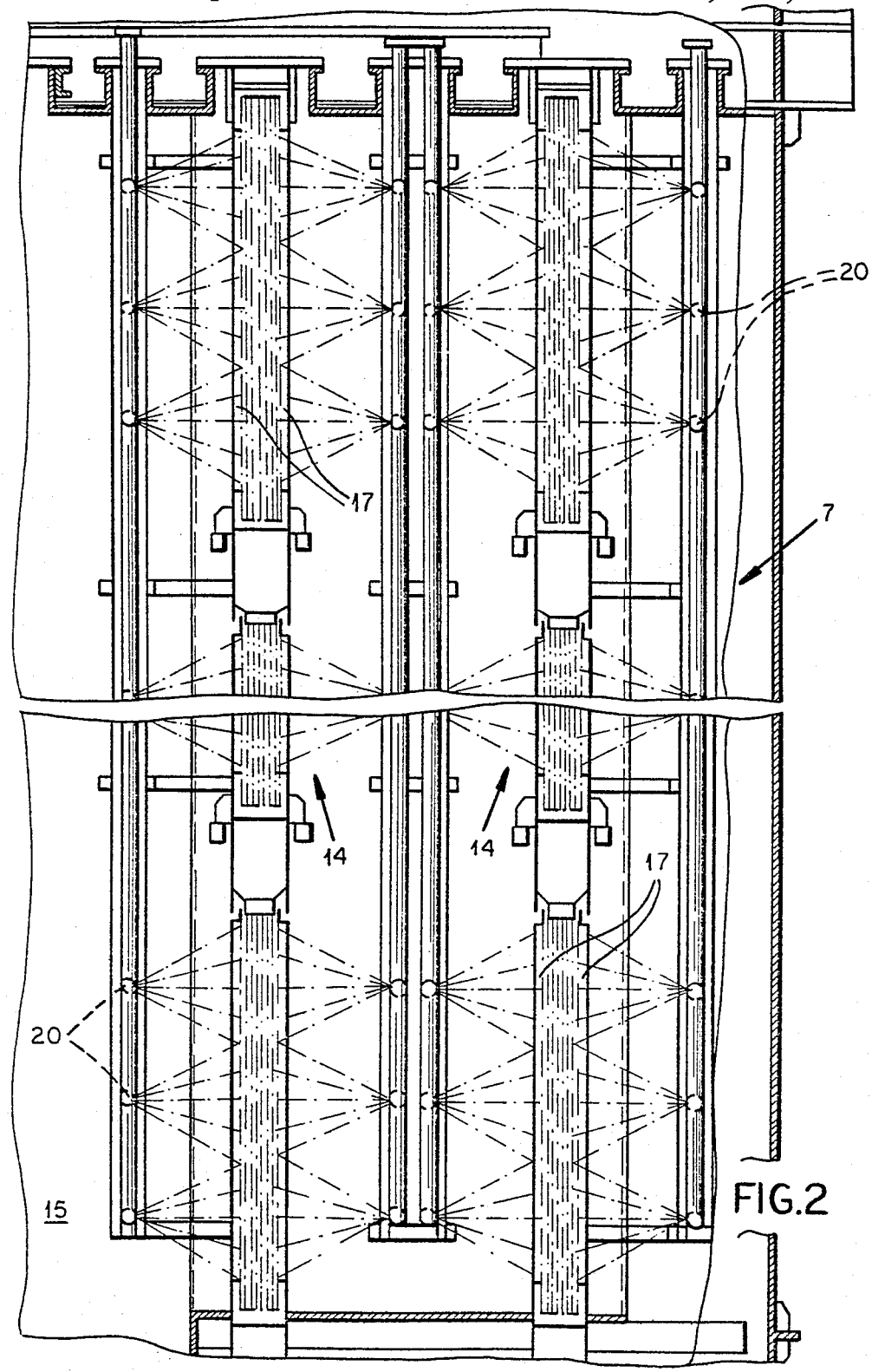
FIG. 2 is a significantly enlarged axial cross section through a portion II of the liquid separator provided at the head of the scrubbing column of FIG. 1 and illustrating the details thereof also somewhat diagrammatically but in greater structural detail.
Figure 4:
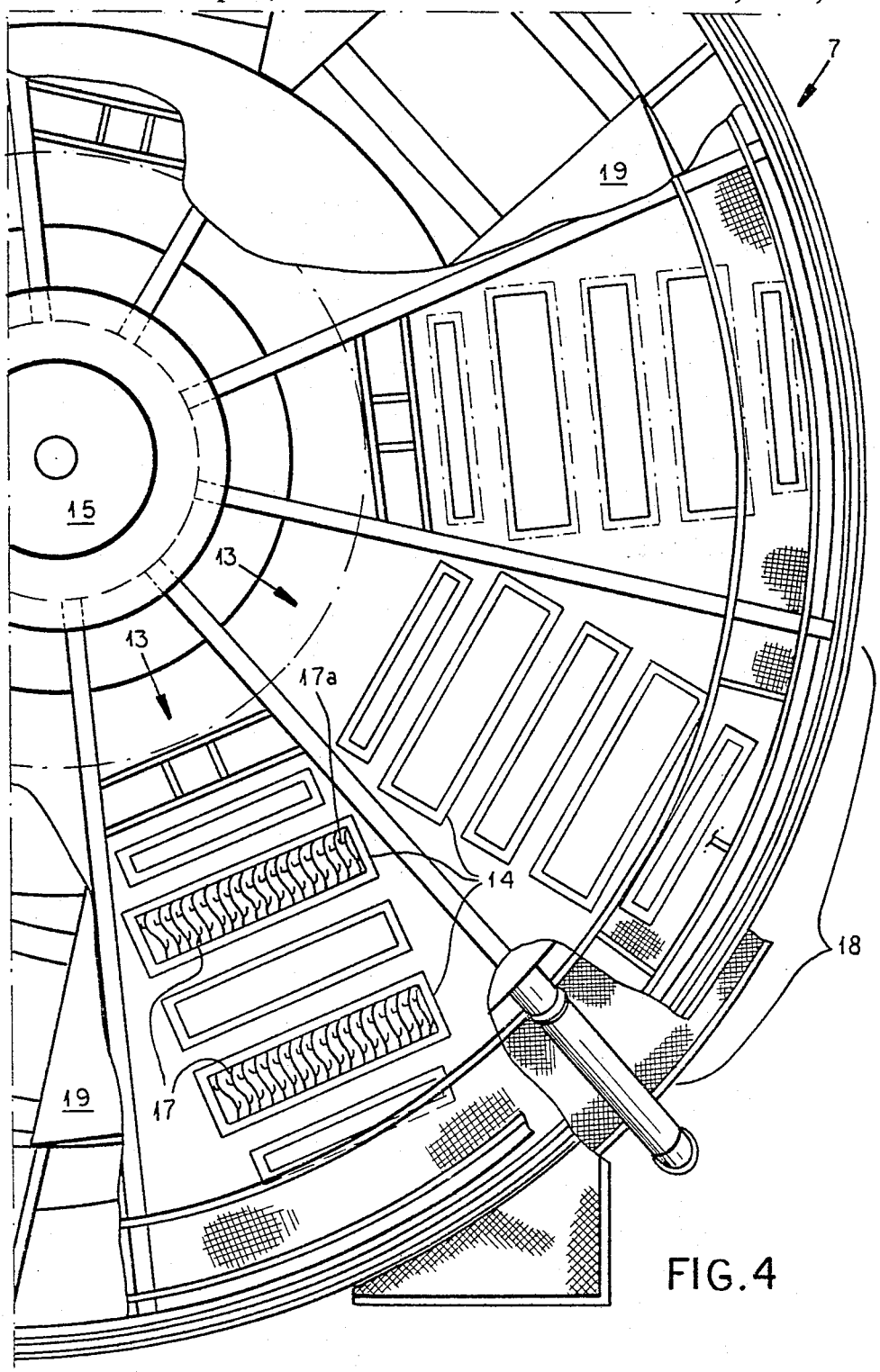
FIG. 4 is a detail view, greatly enlarged in scale of the region C shown in FIG. 3 but viewed in the same direction as in this latter figure.

As is especially apparent from FIGS. 2 and 4, the liquid separator 7 comprises a crown of water-separating registers 13, each of which comprise a number of radially spaced impingement-baffle separators 14 which are encountered one after the other as the gas flows outwardly through these registers.

The registers are formed as respective sectors around a free-space or plenum at the center of the separator (central plenum) which communicates with the column therebelow and has been represented at 15 in the drawing.

The registers 13 are surrounded by an annular discharge passage 16 for the flue gases, (see especially FIG. 3) and the cross section of this passage increases as the gas flow is aligned toward the outlet 4 which is radially offset from the water separator. By a comparison of FIGS. 1 and 4, it will be evident that each of the impingement-baffle separators 14 comprises a stack of vertically elongated plates 17 which have a zigzag configuration in the radial direction and can be provided with catch channels or formations 17a for collecting water and directing the collected water downwardly into trough 1g which is drained through the openings 1c previously mentioned into the sump.

The registers are defined between generally radially extending vertical partitions 19 which form gas-guiding installations or inserts to ensure flow through the impingement baffle separators 14. The registers are in the form of sectors 18 and advantageously ten such sectors can be distributed around the crown. The gas guide bodies 19 ensure that the pressure drop across all ten registers is the same and hence that there will be a uniform distribution of gas flow through the registers.

As can be seen from FIG. 2, fore and aft of the impingement baffle separators 14, spray nozzles 20 can be provided (see FIG. 2) which can be connected to the pump 1e so that scrubbing liquid can be utilized to flush the plates.

Figure 3:
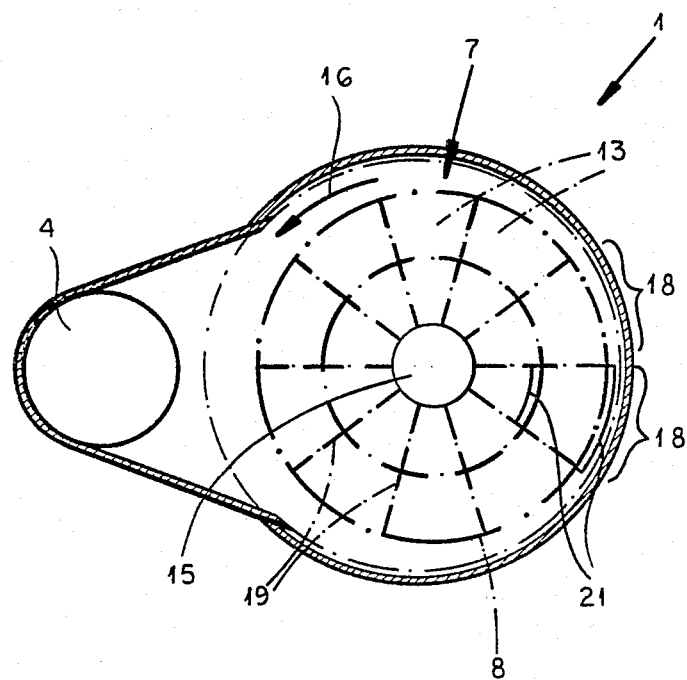
FIG. 3 is a diagrammatic section taken along the line III—III of FIG. 1.

As has been shown diagrammatically in FIG. 3, shutters 21 can be provided which selectively are rotated around the water separator crown to block off one sector from another to enable the blocked-off sector to be flushed with liquid in the manner described previously.

We claim:

1. A scrubbing column for the desulfurization of a flue gas of fossil-fuel combustion comprising:
   a substantially cylindrical upright tower having a head at an upper end and a sump at the lower end thereof;
   means for feeding said flue gas to said tower at a location above said sump whereby said flue gas rises in said tower to said head;
   means for scrubbing the flue gas rising in said tower with a scrubbing liquid, said scrubbing liquid being collected in said sump, said scrubbing liquid constituting a suspension of calcium sulfite and/or calcium sulfate;
   a liquid separator in said head, said liquid separator comprising a substantially cylindrical crown of angularly separated registers surrounding a central plenum communicating with said registers, said crown of registers being surrounded by a discharge passage whereby flue gas from said tower enters said plenum, radially traverses said registers and flows through said passage, each of said registers comprising a plurality of impingement-baffle separators traversed in succession by the flue gas and spaced from one another; and an outlet on said head radially offset from the liquid separator and communicating with said passage, said passage being of increasing flow cross section in the direction of said outlet, each of said impingement-baffle separators comprising a plurality of vertically oriented baffle plates, each being of zigzag cross section in radial direction and provided with means for enabling collected water to pass downwardly.

2. The scrubbing column defined in claim 1 wherein said crown is divided into ten sectors with partitioning elements forming guides for the flue gas in each sector whereby all sectors having identical pressure drops thereacross.

3. The scrubbing column defined in claim 2 wherein said elements are formed as flue gas guide installations.

4. The scrubbing column defined in claim 2, further comprising spray means on at least one side of at least one of the impingement-baffle separators of each register for flushing the plates thereon with liquid.

5. The scrubbing column defined in claim 1, further comprising spray means on at least one side of at least one of the impingement-baffle separators of each register for flushing the plates thereon with liquid.

* * * * *